Patented Nov. 30, 1926.

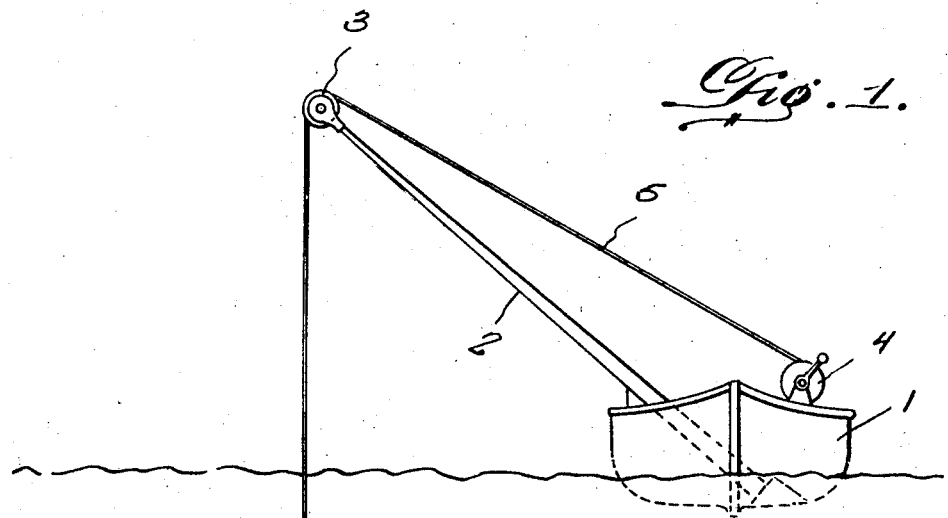
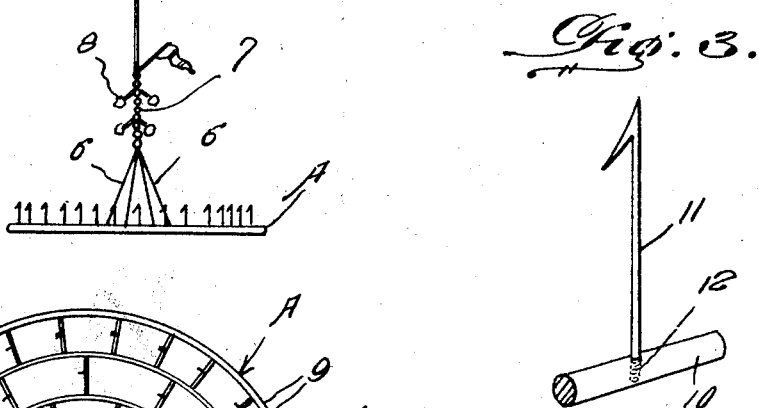
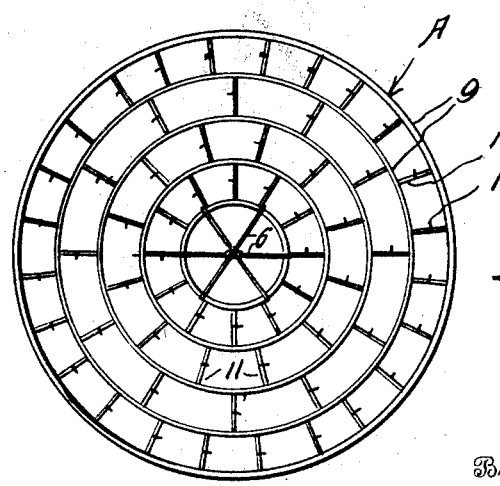

1,608,894

UNITED STATES PATENT OFFICE.

JAMES McGRAIN, OF TACOMA, WASHINGTON.

FISHING APPARATUS.

Application filed January 5, 1926. Serial No. 79,356.

The present invention relates to a fishing apparatus and has for its principal object to provide a structure particularly adapted for deep sea fishing, wherein it is not possible to use a net or the like, because of the under sea current.

Another particular object of the invention is to provide a device of this nature which is adapted to spear the fish, particularly large fish as halibut, cod and the like, from the bottom.

A still further very important object of the invention is to provide a device of this nature which is exceedingly simple in its construction, strong, durable, inexpensive to manufacture, reliable, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:—

Figure 1 is an elevational view showing the features of my invention,

Figure 2 is a plan view of the wheel-like member, and

Figure 3 is an enlarged fragmentary detail perspective of one ring of the wheel-like member showing one of the barbs.

Referring to the drawing in detail it will be seen that 1 designates a boat having a pole projecting therefrom so as to slant upwardly and outwardly in respect to the boat. A pulley 3 is mounted on the outer end of the pole 2. A reel of any suitable construction is designated at 4, and is carried in the boat. A cable 5 is adapted to be wound about the reel 4, and is trained over the pulley 3. Guy members 6 are attached to the extremity of the cable 5 through a chain 7, which supports attractors or baits 8. The guy members 6 support a wheel-like member consisting of a plurality of concentric rings 9 held together by radial cross members 10. The guys 6 are preferably attached to the inner ring as is clearly shown in Figure 2. A plurality of barbs 11 are attached to the radial cross members 10, and may be threadedly engaged therewith as is indicated at 12. These barbs extend perpendicularly to the plane of the wheel-like member.

In using this fishing apparatus the wheel-like member A is lowered in the water to the desired depth, and the attractors 8 will tend to attract fish above the wheel like member A. When the fish nibble at the attractors or bait 8, the line or cable 5 will be agitated, and when so agitated the crank of the reel 4 is started in motion suddenly so that the wheel-like member will rise quickly and spear the fish from the bottom.

It is thought that the construction, operation, and advantages of this apparatus will be clearly understood by those skilled in this art without a more detailed description thereof. It is desired, however, to point out that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

A fishing apparatus comprising a wheel-like member formed from a plurality of concentric rings one within the other, and radially disposed cross members connecting the rings, and a plurality of barbs, one fixed to each radially disposed cross member and extending perpendicularly to the plane of the wheel-like member.

In testimony whereof I affix my signature.

JAMES X McGRAIN.
his / mark